US 12,113,443 B2

(12) United States Patent
Hosotani et al.

(10) Patent No.: US 12,113,443 B2
(45) Date of Patent: Oct. 8, 2024

(54) MULTI-CONVERTER POWER SUPPLY SYSTEM

(71) Applicant: Murata Manufacturing Co., Ltd., Kyoto-fu (JP)

(72) Inventors: Tatsuya Hosotani, Nagaokakyo (JP); Norikazu Sakamoto, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 233 days.

(21) Appl. No.: 17/933,625

(22) Filed: Sep. 20, 2022

(65) Prior Publication Data

US 2023/0016857 A1    Jan. 19, 2023

Related U.S. Application Data

(63) Continuation of application No. PCT/JP2020/039760, filed on Oct. 22, 2020.

(30) Foreign Application Priority Data

Mar. 26, 2020 (JP) .................... 2020-055278

(51) Int. Cl.
*H02M 3/158* (2006.01)
*H02M 1/00* (2007.01)
(52) U.S. Cl.
CPC ....... *H02M 3/1584* (2013.01); *H02M 1/0009* (2021.05)
(58) Field of Classification Search
CPC .. H02M 1/0009; H02M 3/158; H02M 3/1584; H02M 3/1586; H02M 3/1588
See application file for complete search history.

(56) References Cited

U.S. PATENT DOCUMENTS

2006/0209580 A1*  9/2006  Itakura ............... H02J 1/102
                                                          363/65
2008/0089101 A1*  4/2008  Schuellein ......... H02M 3/1584
                                                          363/65
(Continued)

FOREIGN PATENT DOCUMENTS

JP    H10-248261 A    9/1998
JP    2006-262651 A   9/2006
(Continued)

OTHER PUBLICATIONS

International Search Report issued in PCT/JP2020/039760; mailed Dec. 28, 2020.

*Primary Examiner* — Fred E Finch, III
(74) *Attorney, Agent, or Firm* — Studebaker & Brackett PC

(57) ABSTRACT

A multi-converter power supply system includes a plurality of cell converters, a common node to which an individual output terminal of each of the plurality of cell converters is connected, a current waveform signal generation circuit that generates a current waveform signal corresponding to a current waveform flowing through an individual inductor, a current average signal generation circuit that generates a current average signal by averaging temporal changes that the current waveform signal has in a switching period of a switching control circuit, and an instrumentation amplifier that receives input of a current common signal obtained from the common node and the current average signal and that generates an individual current feedback signal to be fed back to the switching control circuit.

20 Claims, 5 Drawing Sheets

(56) References Cited

U.S. PATENT DOCUMENTS

| | | | |
|---|---|---|---|
| 2014/0375288 A1 | 12/2014 | Nora | |
| 2015/0338862 A1* | 11/2015 | Shin | H02M 3/1584 323/281 |
| 2018/0351458 A1* | 12/2018 | Chen | H02M 3/1584 |
| 2022/0131467 A1* | 4/2022 | Hosotani | H02M 3/1586 |

FOREIGN PATENT DOCUMENTS

| | | |
|---|---|---|
| JP | 2011-147269 A | 7/2011 |
| JP | 2013-094058 A | 5/2013 |
| JP | 2017-085856 A | 5/2017 |

\* cited by examiner

MULTI-CONVERTER POWER SUPPLY SYSTEM

CROSS-REFERENCE TO RELATED APPLICATIONS

This application claims benefit of priority to International Patent Application No. PCT/JP2020/039760, filed Oct. 22, 2020, and to Japanese Patent Application No. 2020-055278, filed Mar. 26, 2020, the entire contents of each are incorporated herein by reference.

BACKGROUND

Technical Field

The present disclosure relates to a multi-converter power supply system including a plurality of power conversion units each including a switching circuit and connected in parallel.

Background Art

Japanese Unexamined Patent Application Publication No. 2011-147269 and Japanese Unexamined Patent Application Publication No. 2013-94058 disclose a switching power supply circuit called a multiphase converter. The multiphase converter includes a plurality of power conversion units. For example, the plurality of power conversion units are connected in parallel.

In the multiphase converter, currents of inductors included in the plurality of respective power conversion units are distributed uniformly to achieve a balance, thus stabilizing the operation of the plurality of power conversion units.

SUMMARY

However, although an output current of a power conversion unit is a direct current having a small temporal change, an inductor current flowing through an inductor is a switching current obtained by superimposition of a ripple current on the direct current and having a large temporal change.

For this reason, the ripple current becomes noise, and it is difficult to detect a direct-current component of the inductor current with high accuracy. Furthermore, when the direct-current component of the inductor current is unable to be detected with high accuracy, it is also difficult to distribute inductor currents of the plurality of respective power conversion units uniformly to achieve a balance.

Hence, the present disclosure aims to generate an individual feedback signal by using a current waveform signal that reflects a direct-current component of an inductor current with high accuracy.

A multi-converter power supply system according to this disclosure includes a plurality of cell converters each including a switching element, a switching control circuit, an individual inductor with a first end connected to an output of the switching element, and an individual output terminal connected to a second end of the individual inductor. The multi-converter power system further includes a common node to which the individual output terminal of each of the plurality of cell converters is connected; a current waveform signal generation circuit configured to generate a current waveform signal corresponding to a current waveform flowing through the individual inductor; a current average signal generation circuit configured to generate a current average signal by averaging temporal changes that the current waveform signal has in a switching period of the switching control circuit; and an instrumentation amplifier configured to receive input of a current common signal obtained from the common node and the current average signal and configured to generate an individual current feedback signal to be fed back to the switching control circuit.

In this configuration, the current average signal generation circuit generates a current average signal obtained by subjecting an inductor current to averaging. Subsequently, an individual current feedback signal is generated by using this current average signal. Thus, the individual current feedback signal is not affected by a ripple current superimposed on the inductor current. That is, the individual current feedback signal that reflects a direct-current component of the inductor current with high accuracy is fed back to the switching control circuit.

This disclosure makes it possible to generate an individual feedback signal by using a current waveform signal that reflects a direct-current component of an inductor current with high accuracy.

DETAILED DESCRIPTION

Figure 1:
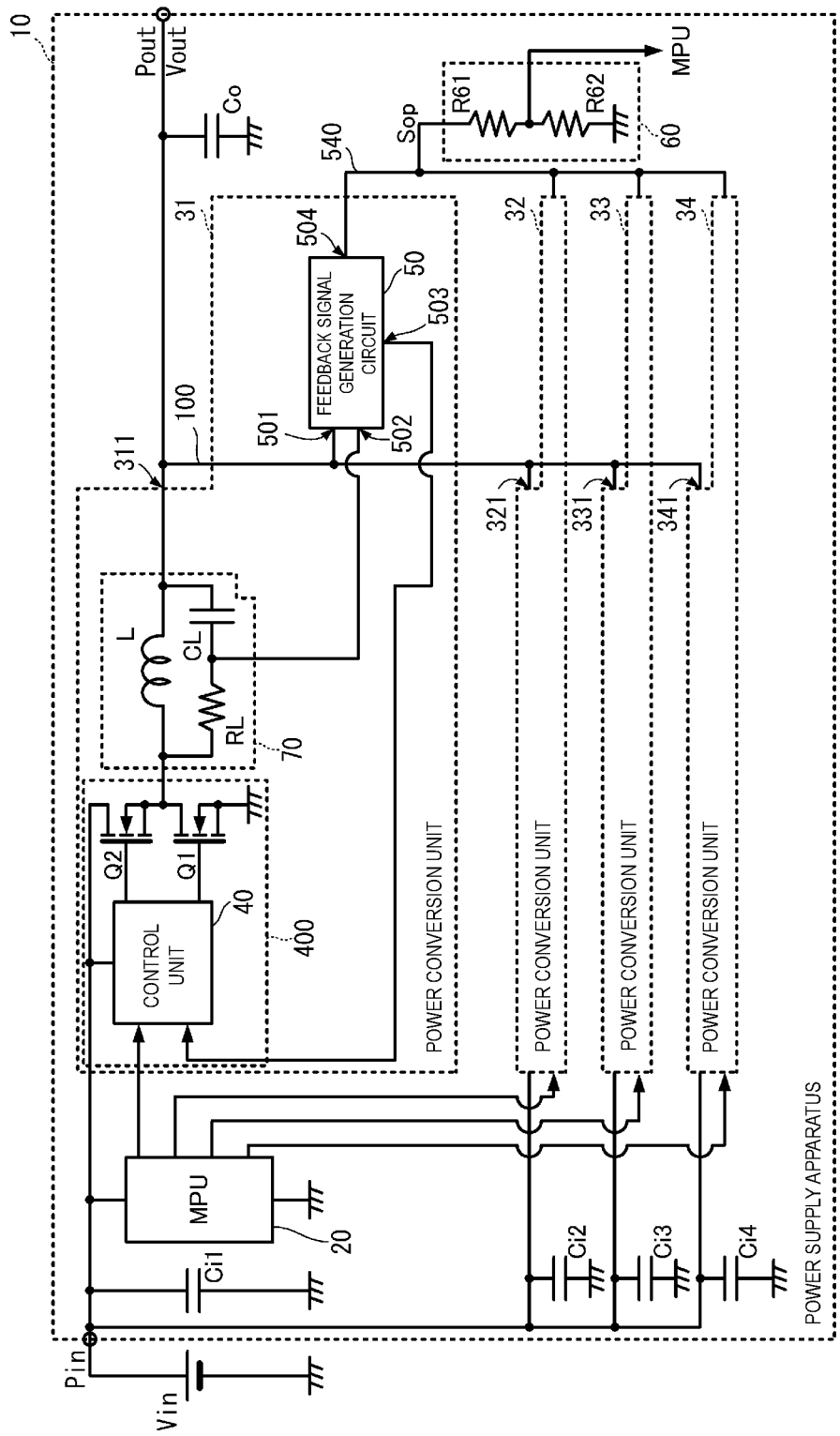
FIG. 1 is a circuit block diagram of a multi-converter power supply system according to an embodiment of the present disclosure.

A multi-converter power supply system according to an embodiment of the present disclosure will be described with reference to the figures. FIG. 1 is a circuit block diagram of a multi-converter power supply system 10 according to the embodiment of the present disclosure.

(Overall Configuration of Multi-Converter Power Supply System 10)

As illustrated in FIG. 1, the multi-converter power supply system 10 includes an MPU 20, a power conversion unit 31, a power conversion unit 32, a power conversion unit 33, a power conversion unit 34, and a voltage divider circuit 60. In the present embodiment, although the number of power conversion units is four, the configuration according to the present embodiment can be used as long as a plurality of power conversion units are provided. The multi-converter power supply system 10 can be implemented, for example, by a circuit board, and various types of ICs and/or electronic components mounted on the circuit board. "Cell converters" according to the present disclosure are implemented by the power conversion unit 31, the power conversion unit 32, the power conversion unit 33, and the power conversion unit 34.

The multi-converter power supply system 10 includes an input terminal Pin and an output terminal Pout. A voltage of the output terminal Pout is an output voltage Vout of the multi-converter power supply system 10.

The input terminal Pin is connected to an external direct-current voltage source. The multi-converter power supply system 10 receives a supply of a direct-current input voltage Vin from the input terminal Pin. The output terminal Pout is connected to a load, which is not illustrated.

Schematically, the multi-converter power supply system 10 appropriately controls, in accordance with the condition of the load connected to the output terminal Pout, of a plurality of power conversion units 31 to 34, operating conditions including the number of power conversion units to be operated. Thus, the multi-converter power supply system 10 stably outputs an output voltage Vout and an output current Iout based on the condition of the load.

The MPU 20 is connected to the input terminal Pin and receives a supply of power through the input terminal Pin. This power supply line is connected to a reference potential through an input capacitor Ci1. The MPU 20 is composed of, for example, a digital electronic circuit and is a programmable Micro Processing Unit. The MPU 20 is a device capable of executing programmable arithmetic processing. The MPU 20 generates a control signal (oscillation control signal) through the programmable arithmetic processing.

The MPU 20 is connected to the power conversion unit 31, the power conversion unit 32, the power conversion unit 33, and the power conversion unit 34. The MPU 20 outputs control signals to the respective power conversion units 31, 32, 33, and 34.

For example, the MPU 20 outputs, to a power conversion unit to be operated (a power conversion unit whose operation is to be enabled) among the plurality of power conversion units, a control signal corresponding to that power conversion unit, and outputs no control signal to a power conversion unit not to be operated (a power conversion unit whose operation is to be disabled).

A control signal includes an oscillation signal based on a switching frequency of each power conversion unit. Oscillation signals of respective control signals have a phase difference, and this phase difference is set in accordance with the number of power conversion units to be operated. Thus, the MPU 20 causes the multi-converter power supply system 10 to operate as a multiphase converter.

Here, a terminal 504 of the power conversion unit 31, a terminal 504 of the power conversion unit 32, a terminal 504 of the power conversion unit 33, and a terminal 504 of the power conversion unit 34 are connected to a current common line 540. A current common signal Sop shared by the plurality of power conversion units 31 to 34 is output to the current common line 540.

The current common line 540 is connected to the MPU 20 through the voltage divider circuit 60. The current common signal Sop voltage-divided by the voltage divider circuit 60 is input to the MPU 20. The MPU 20 determines, in accordance with the level of this current common signal Sop, the number of power conversion units to be operated, determines a phase difference in accordance with the number, and sets a control signal to a power conversion unit to be operated.

The power conversion unit 31, the power conversion unit 32, the power conversion unit 33, and the power conversion unit 34 are connected to the input terminal Pin and receive a supply of power through the input terminal Pin. A power supply line for the power conversion unit 31 is connected to the reference potential through the input capacitor Ci1. A power supply line for the power conversion unit 32 is connected to the reference potential through an input capacitor Ci2. A power supply line for the power conversion unit 33 is connected to the reference potential through an input capacitor Ci3. A power supply line for the power conversion unit 34 is connected to the reference potential through an input capacitor Ci4.

An individual output terminal 311 of the power conversion unit 31, an individual output terminal 321 of the power conversion unit 32, an individual output terminal 331 of the power conversion unit 33, and an individual output terminal 341 of the power conversion unit 34 are connected in parallel by a common node 100 and are connected to the output terminal Pout. The output terminal Pout is connected to the reference potential through an output capacitor Co.

(Configurations of Power Conversion Units 31 to 34)

The power conversion unit 31, the power conversion unit 32, the power conversion unit 33, and the power conversion unit 34 have the same circuit configuration. Hence, a circuit configuration of only the power conversion unit 31 will be specifically described below.

As illustrated in FIG. 1, the power conversion unit 31 includes an inductor L, a resistor RL, a capacitor CL, a PWM control IC 400, and a feedback signal generation circuit 50. The inductor L corresponds to "individual inductor" of the present disclosure. The feedback signal generation circuit 50 corresponds to "individual current feedback signal generation circuit" of the present disclosure.

The PWM control IC 400 includes a control unit 40, a switching element Q1, and a switching element Q2. The PWM control IC 400 is constituted by a FET integrated into one. The control unit 40 corresponds to "switching control circuit" of the present disclosure. The PWM control IC 400 is implemented by one analog IC. Thus, the control unit 40, the switching element Q1, and the switching element Q2 are incorporated and integrated into one package IC.

The PWM control IC 400 is connected to the input terminal Pin and receives a supply of power through the input terminal Pin.

A control signal is input from the MPU 20 to the control unit 40. Furthermore, an individual combined feedback signal is input to the control unit 40. The individual combined feedback signal is a combined signal of an individual voltage feedback signal and an individual current feedback signal. The control unit 40 generates a switching control signal using PWM (pulse width modulation) control for the switching element Q1 and the switching element Q2 from the control signal and the individual combined feedback signal.

A gate of the switching element Q2 is connected to the control unit 40, a drain is connected to the input terminal Pin, and a source is connected to a drain of the switching element Q1. A gate of the switching element Q1 is connected to the control unit 40, and a source is connected to the ground reference potential.

A switching control signal for the switching element Q2 is input from the control unit 40 to the gate of the switching element Q2. A switching control signal for the switching element Q1 is input from the control unit 40 to the gate of the switching element Q1.

(Current Waveform Signal Generation Circuit)

A first end of the inductor L is connected to a connection point between the source of the switching element Q2 and the drain of the switching element Q1. A second end of the inductor L is connected to the individual output terminal 311.

A series circuit of the resistor RL and the capacitor CL is connected in parallel with the inductor L. A current waveform signal generation circuit 70 is constituted by a circuit composed of the inductor L, the resistor RL, and the capacitor CL. The series circuit of the resistor RL and the capacitor CL corresponds to "RC time constant circuit" of the present disclosure. A time constant of the RC time constant circuit is set in accordance with a time constant determined by an inductance Ls of the inductor L and an equivalent series resistance. Specifically, the time constant is set to achieve a relationship of $Rs/Ls=1/(CLs \cdot RLs)$, where Ls is the inductance of the inductor L, Rs is a resistance value of the equivalent series resistance, CLs is a capacitance of the capacitor CL, and RLs is a resistance value of the resistor RL. Thus, the current waveform signal generation circuit 70 can detect a current flowing through the inductor L without loss. That is, a current waveform signal output from the current waveform signal generation circuit 70 is a signal that reflects a current flowing through the inductor L without loss.

(Individual Feedback Signal Generation Circuit)

The feedback signal generation circuit 50 includes a terminal 501, a terminal 502, a terminal 503, and the terminal 504. The terminal 501 is connected to the common node 100. The terminal 502 is connected to a connection point between the resistor RL and the capacitor CL. The terminal 503 is connected to the control unit 40 of the PWM control IC 400. The terminal 504 is connected to the current common line 540. The feedback signal generation circuit 50 implements "individual current feedback signal generation circuit" and "individual voltage feedback signal generation circuit" of the present disclosure.

Figure 2:
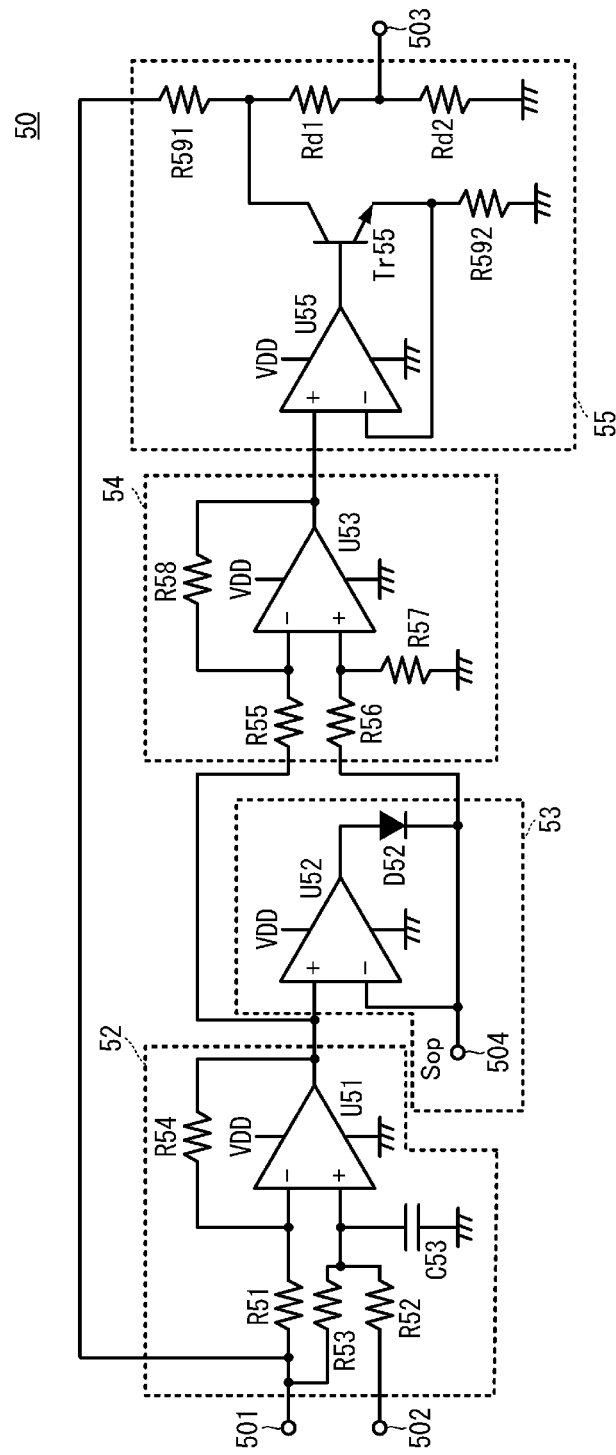
FIG. 2 is a circuit diagram of a feedback signal generation unit according to the embodiment of the present disclosure.

The feedback signal generation circuit 50 has the following functional configuration. FIG. 2 is a circuit diagram of a feedback signal generation unit according to the embodiment of the present disclosure. As illustrated in FIG. 2, the feedback signal generation circuit 50 includes an instrumentation amplifier 52, a common signal generation circuit 53, an instrumentation amplifier 54, and an adjustment amplifier 55. The instrumentation amplifier 52 corresponds to "instrumentation amplifier" of the present disclosure.

(First Instrumentation Amplifier)

The instrumentation amplifier 52 includes an amplifier U51, a resistor R51, a resistor R52, a resistor R53, a resistor R54, and a capacitor C53. A specific configuration and operation of the instrumentation amplifier 52 will be described later. Incidentally, the instrumentation amplifier 52 is preferably constituted by a plurality of amplifiers including a first-stage amplifier, which are not illustrated. Thus, even when an inductor current is very small, the feedback signal generation circuit 50 can generate an individual current feedback signal with more stability and certainty.

(Common Signal Generation Circuit)

The common signal generation circuit 53 includes an amplifier U52, and a diode D52. A non-inverting input terminal of the amplifier U52 is connected to an output terminal of the amplifier U51. An output terminal of the amplifier U52 is connected to an inverting input terminal of the amplifier U52 through the diode D52. At this time, an anode of the diode D52 is connected to the output terminal of the amplifier U52, and a cathode of the diode D52 is connected to the inverting input terminal. The inverting input terminal is connected to the terminal 504, that is, to the current common line 540.

When this circuit configuration is employed, the common signal generation circuit 53 implements a circuit for holding a maximum value of individual current signals for the plurality of power conversion units 31 to 34. A signal based on this maximum value of the individual current signals corresponds to "current common signal" of the present disclosure.

(Second Instrumentation Amplifier)

The instrumentation amplifier 54 includes an amplifier U53, a resistor R55, a resistor R56, a resistor R57, and a resistor R58.

An inverting input terminal of the amplifier U53 is connected to the output terminal of the amplifier U51 through the resistor R55. A non-inverting input terminal of the amplifier U53 is connected, through the resistor R56, to the cathode of the diode D52 and to the terminal 504, that is, to the current common line 540. The non-inverting input terminal of the amplifier U53 is connected to the reference potential through the resistor R57. An output terminal of the amplifier U53 is connected to the inverting input terminal of the amplifier U53 through the resistor R58.

(Adjustment Amplifier)

The adjustment amplifier 55 includes an amplifier U55, a transistor Tr55, a resistor R591, a resistor R592, the resistor Rd1, and the resistor Rd2.

A non-inverting input terminal of the amplifier U55 is connected to the output terminal of the amplifier U53. An output terminal of the amplifier U55 is connected to a base of the NPN-type transistor Tr55. A collector of the transistor Tr55 is connected to the terminal 501, that is, to the common node 100 through the resistor R591. An emitter of the transistor Tr55 is connected to the reference potential through the resistor R592. Furthermore, the emitter of the transistor Tr55 is connected to an inverting input terminal of the amplifier U55. Additionally, a connection point between the collector of the transistor Tr55 and the resistor R591 is connected to the reference potential through a series circuit of the resistor Rd1 and the resistor Rd2. A connection point between the resistor Rd1 and the resistor Rd2 is connected to the terminal 503.

(Operation of First Instrumentation Amplifier)

Figure 3:
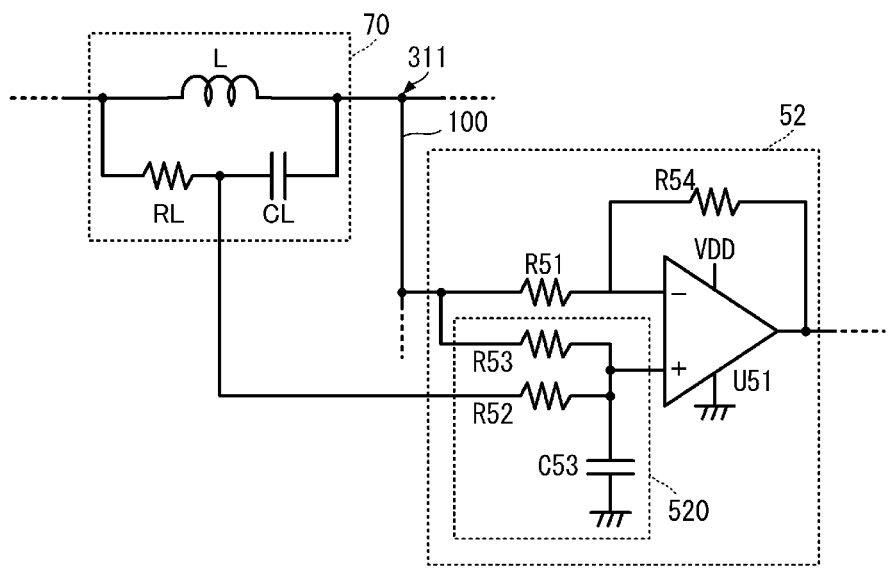
FIG. 3 is a circuit diagram illustrating a connection portion between an instrumentation amplifier and a current waveform signal generation circuit.

FIG. 3 is a circuit diagram illustrating a connection portion between the instrumentation amplifier and the current waveform signal generation circuit.

An inverting input terminal of the amplifier U51 is connected to the terminal 501 through the resistor R51. That is, the inverting input terminal of the amplifier U51 is connected to the individual output terminal 311 through the resistor R51. The resistor R51 corresponds to "first resistor" of the present disclosure.

A non-inverting input terminal of the amplifier U51 is connected to the terminal 502 through the resistor R52. That is, the non-inverting input terminal of the amplifier U51 is connected to the current waveform signal generation circuit 70 through the resistor R52. The resistor R52 corresponds to "second resistor" of the present disclosure. More specifically, the non-inverting input terminal of the amplifier U51 is connected to the connection point between the resistor RL and the capacitor CL in the current waveform signal generation circuit 70 through the resistor R52.

The non-inverting input terminal of the amplifier U51 is connected to the terminal 501 through the resistor R53. That is, the non-inverting input terminal of the amplifier U51 is connected to the common node 100 through the resistor R53. The resistor R53 corresponds to "third resistor" of the present disclosure.

The output terminal of the amplifier U51 is connected to the inverting input terminal of the amplifier U51 through the resistor R54.

The non-inverting input terminal of the amplifier U51 is connected to the reference potential through the capacitor C53.

When this circuit configuration is employed, in the instrumentation amplifier 52, an individual output voltage signal of the individual output terminal 311 is input to the inverting input terminal of the amplifier U51, and a current waveform signal is input to the non-inverting input terminal of the amplifier U51. Subsequently, the amplifier U51 amplifies a differential signal between the individual output voltage signal and the current waveform signal with a predetermined amplification factor and outputs the signal.

An output signal of the amplifier U51 of this instrumentation amplifier 52 is output to the common signal generation circuit 53. The common signal generation circuit 53 shares, by using the current common line 540, a maximum signal of output signals from amplifiers U51 of the plurality of respective power conversion units 31 to 34 connected to the common node 100 and thus generates and outputs a current common signal.

The output signal from the amplifier U51 of the instrumentation amplifier 52 and the current common signal are input to the instrumentation amplifier 54. The instrumentation amplifier 54 generates an individual current feedback signal, which is a differential signal between the output signal from the amplifier U51 of the instrumentation amplifier 52 and the current common signal, amplifies the individual current feedback signal with a predetermined amplification factor, and outputs the signal. This individual current feedback signal is output through the adjustment amplifier 55.

The adjustment amplifier 55 includes a configuration of an individual voltage feedback signal generation circuit. Specifically, a series circuit of the resistor R591, the resistor Rd1, and the resistor Rd2 in the adjustment amplifier 55 is connected between the terminal 501 and the reference potential, that is, between the individual output terminal 311 and the reference potential. Furthermore, the connection point between the resistor Rd1 and the resistor Rd2 is connected to the terminal 503. Thus, a voltage divided by the combined resistance of the resistor R591 and the resistor Rd1, and the resistor Rd2 is output as an individual voltage feedback signal.

Hence, an individual combined feedback signal, which is a combined signal of the individual current feedback signal and the individual voltage feedback signal, is output from the terminal 503 and is fed back to the control unit 40. Subsequently, the control unit 40 performs switching control in accordance with this individual combined feedback signal.

Thus, a current waveform signal input to the instrumentation amplifier 52 affects an individual current feedback signal and an individual combined feedback signal and is also important for the accuracy and stabilization of switching control.

Here, when the instrumentation amplifier 52 has the above-described configuration, the current waveform signal and the individual output voltage signal are formed with reference to a potential of the common node 100. Thus, the following function effects can be achieved.

Figure 4A:
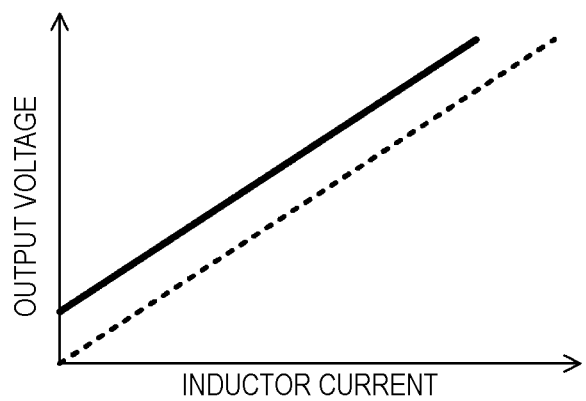
FIG. 4A is a graph illustrating a relationship between an inductor current and an output voltage of a feedback signal generation circuit exhibited when the embodiment of the present disclosure is employed.
Figure 4B:
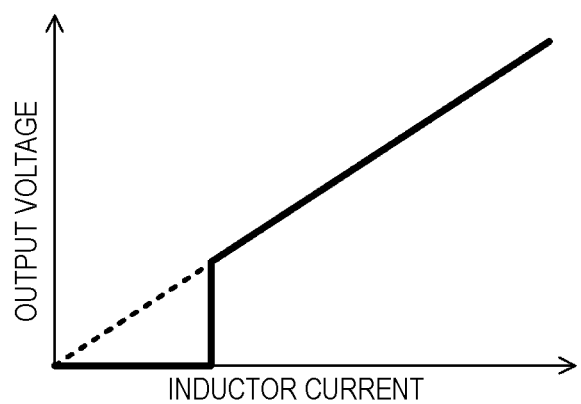
FIG. 4B is a graph illustrating a relationship between an inductor current and an output voltage of the feedback signal generation circuit exhibited when a comparative example is employed.

FIG. 4A is a graph illustrating a relationship between an inductor current and an output voltage of the feedback signal generation circuit exhibited when the embodiment of the present disclosure is employed. FIG. 4B is a graph illustrating a relationship between an inductor current and an output voltage of the feedback signal generation circuit exhibited when a comparative example is employed. A configuration according to the comparative example is a configuration in which a circuit configuration of a typical instrumentation amplifier is employed, and a non-inverting input terminal of a first-stage amplifier is not connected to an individual output terminal of a power conversion unit, but is connected to the reference potential through a resistor.

Ideally, as illustrated in FIGS. 4A and 4B, the output voltage of the feedback signal generation circuit increases in proportion to the inductor current as the inductor current increases. Hence, when the output voltage of the feedback signal generation circuit is referred to, the inductor current can be adjusted with high accuracy and stability.

As illustrated in FIG. 4B, however, in the circuit configuration according to the comparative example, the output voltage reaches 0 in a certain range in which the inductor current is small. This is because, when the inductor current is small, a potential of the non-inverting input terminal is lower than a potential of the inverting input terminal in some cases. In this case, a level of an output signal of the instrumentation amplifier 52 is not proportional to a level of the inductor current. For this reason, an individual current feedback signal is unable to be generated with stability and high accuracy.

On the other hand, as illustrated in FIG. 4A, in the circuit configuration according to the present disclosure, the output voltage does not reach 0 even when the inductor current is small, and a level of the output voltage is proportional to a level of the inductor current.

Hence, when the circuit configuration according to the present disclosure is used, even when the inductor current is small, an output voltage can be controlled with high accuracy and stability. That is, the multi-converter power supply system 10 can stabilize a common voltage to a load with high accuracy even when a load current is small.

Incidentally, as illustrated in FIG. 4A, in the circuit configuration of the present disclosure, an offset is present in comparison with ideal characteristics. However, this offset value is the same as the output voltage Vout and is a known value. Hence, the multi-converter power supply system 10 can stabilize a common voltage to a load with high accuracy and without being affected by the offset.

Furthermore, in the multi-converter power supply system 10 according to the present embodiment, more specifically, as illustrated in FIGS. 2 and 3, a current average signal generation circuit 520 is implemented by the resistor R53, the resistor R52, and the capacitor C53. A time constant of this current average signal generation circuit 520 is set low in accordance with a switching period of the control unit 40 and is set at a value with which temporal changes of a current waveform signal in the switching period can be averaged.

Thus, the current waveform signal is subjected to averaging. That is, a current average signal obtained by subjecting the current waveform signal to averaging is input to the non-inverting input terminal of the amplifier U51. Subsequently, the amplifier U51 amplifies a differential signal between an individual output voltage signal and the current average signal with the predetermined amplification factor and outputs the signal.

This configuration makes it possible to remove a switching ripple and switching ripple noise that are contained in an inductor current and to control the operation of the power conversion units 31 to 34 with stability. Furthermore, the accuracy of detecting an inductor current can be increased.

Furthermore, in this configuration, the resistance value of the resistor RL constituting the RC time constant circuit of the current waveform signal generation circuit 70 does not have to be reduced. Thus, heat generated by the resistor RL can be reduced, and the power efficiency of the power conversion units 31 to 34 can be increased.

Furthermore, when the multi-converter power supply system 10 has the above-described configuration, the following function effects can be achieved.

The multi-converter power supply system 10 can make inductor currents uniform with the plurality of power conversion units 31 to 34. That is, the multi-converter power supply system 10 can distribute currents of the respective inductors L of the plurality of power conversion units 31 to 34 uniformly to achieve a balance and can stabilize the operation of the plurality of power conversion units 31 to 34. Furthermore, the multi-converter power supply system 10 can keep the inductor of a certain power conversion unit from generating heat locally.

In the multi-converter power supply system 10, a potential of the non-inverting input terminal of the amplifier U51 of the instrumentation amplifier 52, that is, reference potentials of a current waveform signal and a current average signal are at the second end of the inductor L of each of the power conversion units 31 to 34. Thus, even when line impedances between the power conversion units 31 to 34 generated by the circuit layout of the multi-converter power supply system 10 are different, an inductor current can be made uniform with stability and high accuracy and without being affected by line impedance.

Figure 5:
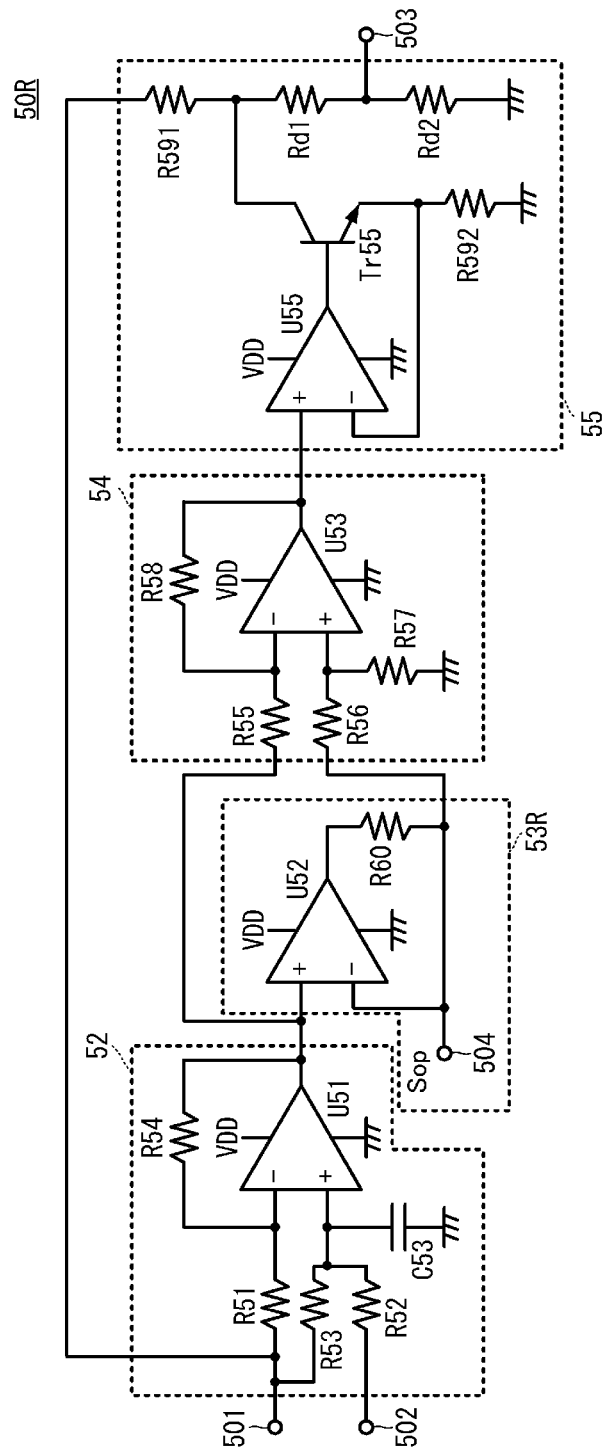
FIG. 5 is a circuit diagram illustrating another example of the feedback signal generation unit according to the embodiment of the present disclosure.

Furthermore, in the above-description, the form has been discussed in which the feedback signal generation circuit is constituted by a maximum current tracking circuit. As illustrated in FIG. 5, however, the feedback signal generation circuit can also be constituted by an average current tracking circuit. FIG. 5 is a circuit diagram illustrating another example of the feedback signal generation unit according to the embodiment of the present disclosure.

As illustrated in FIG. 5, a feedback signal generation circuit 50R in which the average current tracking circuit is employed differs in the configuration of a common signal generation circuit 53R from the feedback signal generation circuit 50 in which the maximum current tracking circuit is employed illustrated in FIG. 2. Except for the above, the configuration of the feedback signal generation circuit 50R is similar to that of the feedback signal generation circuit 50, and a description of similar portions is omitted.

The common signal generation circuit 53R includes the amplifier U52 and a resistor R60. The non-inverting input terminal of the amplifier U52 is connected to the output terminal of the amplifier U51. The output terminal of the amplifier U52 is connected to the inverting input terminal of the amplifier U52 through the resistor R60. The inverting input terminal is connected to the terminal 504, that is, to the current common line 540.

Even when such an average current tracking circuit is used, as in the case where the above-described maximum current tracking circuit is used, the multi-converter power supply system can stabilize a common voltage to a load with high accuracy even when a load current is small. Furthermore, when a current waveform signal is subjected to averaging, the multi-converter power supply system can increase the accuracy of detecting an inductor current, distribute currents of the respective inductors L of the plurality of power conversion units 31 to 34 uniformly to achieve a balance, and stabilize the operation of the plurality of power conversion units 31 to 34.

What is claimed is:

1. A multi-converter power supply system comprising:
    a plurality of cell converters each including a switching element, a switching control circuit, an individual inductor with a first end connected to an output of the switching element, and an individual output terminal connected to a second end of the individual inductor;
    a common node to which the individual output terminal of each of the plurality of cell converters is connected;
    a current waveform signal generation circuit configured to generate a current waveform signal corresponding to a current waveform flowing through the individual inductor;
    a current average signal generation circuit configured to generate a current average signal by averaging temporal changes that the current waveform signal has in a switching period of the switching control circuit; and
    an instrumentation amplifier configured to receive input of a current common signal obtained from the common node and the current average signal and configured to generate an individual current feedback signal to be fed back to the switching control circuit.

2. The multi-converter power supply system according to claim 1, wherein
    the instrumentation amplifier includes a first operational amplifier configured to receive input of the current common signal and the current average signal,
    an inverting input terminal of the first operational amplifier is connected to the common node through a first resistor,
    a non-inverting input terminal of the first operational amplifier is connected to the current waveform signal generation circuit through a second resistor, and
    a capacitor constituting the current average signal generation circuit is connected between the non-inverting input terminal and a reference potential.

3. The multi-converter power supply system according to claim 2, wherein
    the instrumentation amplifier is constituted by a plurality of operational amplifiers including the first operational amplifier.

4. The multi-converter power supply system according to claim 3, wherein
    a time constant of the current average signal generation circuit is set low in accordance with the switching period to average temporal changes in the switching period.

5. The multi-converter power supply system according to claim 3, wherein
    the current waveform signal generation circuit includes an RC time constant circuit, and
    a time constant of the RC time constant circuit is set in accordance with a time constant determined by an inductance of the individual inductor and an equivalent series resistance.

6. The multi-converter power supply system according to claim 3, further comprising:
    a current common signal generation circuit configured to generate a current common signal by using an output signal of the instrumentation amplifier and a common node signal; and
    an individual current feedback signal generation circuit configured to generate the individual current feedback signal by using an output signal of the instrumentation amplifier and the current common signal.

7. The multi-converter power supply system according to claim 2, wherein a time constant of the current average signal generation circuit is set low in accordance with the switching period to average temporal changes in the switching period.

8. The multi-converter power supply system according to claim 2, wherein
the current waveform signal generation circuit includes an RC time constant circuit, and
a time constant of the RC time constant circuit is set in accordance with a time constant determined by an inductance of the individual inductor and an equivalent series resistance.

9. The multi-converter power supply system according to claim 2, further comprising:
a current common signal generation circuit configured to generate a current common signal by using an output signal of the instrumentation amplifier and a common node signal; and
an individual current feedback signal generation circuit configured to generate the individual current feedback signal by using an output signal of the instrumentation amplifier and the current common signal.

10. The multi-converter power supply system according to claim 1, wherein
a time constant of the current average signal generation circuit is set low in accordance with the switching period to average temporal changes in the switching period.

11. The multi-converter power supply system according to claim 10, wherein
the current waveform signal generation circuit includes an RC time constant circuit, and
a time constant of the RC time constant circuit is set in accordance with a time constant determined by an inductance of the individual inductor and an equivalent series resistance.

12. The multi-converter power supply system according to claim 10, further comprising:
a current common signal generation circuit configured to generate a current common signal by using an output signal of the instrumentation amplifier and a common node signal; and
an individual current feedback signal generation circuit configured to generate the individual current feedback signal by using an output signal of the instrumentation amplifier and the current common signal.

13. The multi-converter power supply system according to claim 1, wherein
the current waveform signal generation circuit includes an RC time constant circuit, and
a time constant of the RC time constant circuit is set in accordance with a time constant determined by an inductance of the individual inductor and an equivalent series resistance.

14. The multi-converter power supply system according to claim 13, further comprising:
a current common signal generation circuit configured to generate a current common signal by using an output signal of the instrumentation amplifier and a common node signal; and
an individual current feedback signal generation circuit configured to generate the individual current feedback signal by using an output signal of the instrumentation amplifier and the current common signal.

15. The multi-converter power supply system according to claim 1, further comprising:
a current common signal generation circuit configured to generate a current common signal by using an output signal of the instrumentation amplifier and a common node signal; and
an individual current feedback signal generation circuit configured to generate the individual current feedback signal by using an output signal of the instrumentation amplifier and the current common signal.

16. The multi-converter power supply system according to claim 15, wherein
the individual current feedback signal generation circuit includes a maximum current tracking circuit.

17. The multi-converter power supply system according to claim 16, further comprising:
an individual voltage feedback signal generation circuit configured to generate an individual voltage feedback signal corresponding to a voltage of the individual output terminal,
wherein an individual combined feedback signal obtained by combining the individual current feedback signal and the individual voltage feedback signal is fed back to the switching control circuit.

18. The multi-converter power supply system according to claim 15, wherein
the individual current feedback signal generation circuit includes an average current tracking circuit.

19. The multi-converter power supply system according to claim 18, further comprising:
an individual voltage feedback signal generation circuit configured to generate an individual voltage feedback signal corresponding to a voltage of the individual output terminal,
wherein an individual combined feedback signal obtained by combining the individual current feedback signal and the individual voltage feedback signal is fed back to the switching control circuit.

20. The multi-converter power supply system according to claim 1, wherein
the switching element and the switching control circuit are incorporated and integrated into one package IC.

* * * * *